C. H. CRAWFORD.
Apparatus for Generating and Carbureting Hydrogen Gas.
No. 151,095. Patented May 19, 1874.
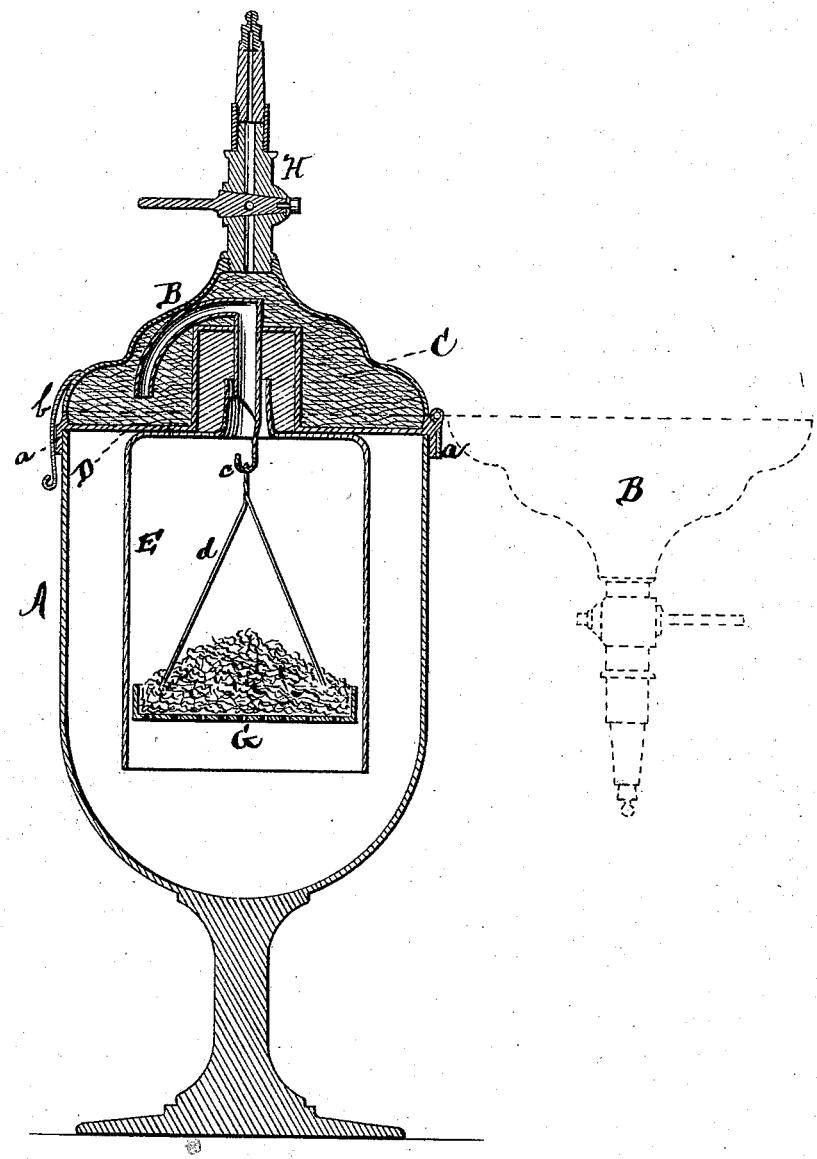
WITNESSES. INVENTOR

UNITED STATES PATENT OFFICE.

CHARLES H. CRAWFORD, OF NEW YORK, N. Y.

IMPROVEMENT IN APPARATUS FOR GENERATING AND CARBURETING HYDROGEN GAS.

Specification forming part of Letters Patent No. 151,095, dated May 19, 1874; application filed May 14, 1874.

*To all whom it may concern:*

Be it known that I, CHARLES H. CRAWFORD, of New York, in the county of New York and in the State of New York, have invented certain new and useful Improvements in Apparatus for Generating and Carbureting Hydrogen Gas; and do hereby declare that the following is a full, clear, and exact description thereof, reference being had to the accompanying drawings, and to the letters of reference marked thereon, making a part of this specification.

My invention consists in the construction of an apparatus for generating and carbureting hydrogen gas, as will be more fully hereinafter set forth.

The accompanying drawing represents a vertical section taken through the center of the apparatus, the dotted lines showing the top thrown back on its hinge.

A represents an urn-shaped glass vessel, upon the top of which is placed a dome, B, which contains the carbureting material. This dome is hinged to a circular plate, D, provided with a circular downward-projecting flange, a, which fits over the top edge of the vessel A. Attached to the under part of the plate D is an inverted glass cup, E. A curved pipe, I, leads from the center of the cup E, at its top, through the plate D, and into the carbureting-dome B. The lower end of this pipe is formed into a hook, as shown at c, to which is attached, by rods d, a perforated basket, G, to contain zinc or iron turnings, or other equivalent material. Leading from the top of the dome B is the gas-pipe H, provided with the usual stop-cock. Within the dome I place a quantity of manila-hemp, C. This hemp I have found to be perfect as a carbureter, inasmuch as it is an excellent absorbent, it retaining the carbon oil in its liquid state, and does not pack and become soggy.

In operation, I fill the vessel A about half full with a mixture of common commercial acid and water, in sufficient proportions to generate hydrogen gas. The dome B, plate D, cup E, and basket G are all connected together. These parts are then placed upon the vessel A, as shown in the drawings. The latch b is opened, and the dome B thrown back on its hinge when the hemp C is put upon the plate D. This hemp is then charged with carbon oil, and the dome fastened down over the hemp. By thus having the dome hinged, or otherwise readily detachable, I am enabled to easily charge the apparatus, or replace the carbureting material without affecting the other parts.

It will be understood that the dome is so perfectly fitted upon the plate that air cannot enter, or gas escape between the joints. Instead of having the dome hinged, I may, in some cases, connect it to the plate by a screw-connection.

Upon opening the cock at the burner the air will escape, and the dilute water will rise in the cup E until it reaches the zinc or iron in the basket G, and the generation of gas will begin. The gas, after passing through the carbureter, will escape at the burner, and it is only necessary to apply the match to burn the generated gas. As the hydrogen gas passes through the carbureter it picks up sufficient carbon from the manila-hemp, thereby creating a pure white light.

Having thus fully described my invention, what I claim is—

1. In an apparatus for generating hydrogen gas, the hinged or otherwise detachable dome B, which covers the carbureting material C placed upon the flanged plate D, substantially as and for the purposes set forth.

2. The employment of manila-hemp as a carbureter between the dome B and plate D, as set forth.

3. The combination of the curved pipe I with the cup E, carbureter C, dome B, and pipe H, all substantially as and for the purposes set forth.

In testimony that I claim the foregoing I have hereunto set my hand this 14th day of May, 1874.

C. H. CRAWFORD.

Witnesses:
 J. M. MASON,
 C. M. ALEXANDER.